(12) United States Patent
Montanari et al.

(10) Patent No.: US 10,308,849 B2
(45) Date of Patent: Jun. 4, 2019

(54) ADHESIVE COMPOSITION AND STRUCTURE COMPRISING AT LEAST ONE LAYER OF SAID COMPOSITION

(71) Applicant: ARKEMA FRANCE, Colombes (FR)

(72) Inventors: Thibaut Montanari, Menneval (FR); Alexandre Vermogen, Beaumont le Roger (FR); Fabrice Montezin, Saint Aubin de Scellon (FR); Vincent Ferreiro, Pont du Chateau (FR)

(73) Assignee: ARKEMA FRANCE, Colombes (FR)

( * ) Notice: Subject to any disclaimer, the term of this patent is extended or adjusted under 35 U.S.C. 154(b) by 264 days.

(21) Appl. No.: 14/763,381

(22) PCT Filed: Jan. 24, 2014

(86) PCT No.: PCT/EP2014/051434
§ 371 (c)(1),
(2) Date: Jul. 24, 2015

(87) PCT Pub. No.: WO2014/114766
PCT Pub. Date: Jul. 31, 2014

(65) Prior Publication Data
US 2015/0353792 A1    Dec. 10, 2015

(30) Foreign Application Priority Data
Jan. 25, 2013 (FR) ...................... 13 50664

(51) Int. Cl.
| | |
|---|---|
| B32B 27/34 | (2006.01) |
| B32B 1/08 | (2006.01) |
| C09J 177/06 | (2006.01) |
| C09J 177/00 | (2006.01) |
| F16L 11/04 | (2006.01) |
| C08L 77/00 | (2006.01) |
| C08G 69/36 | (2006.01) |
| C08G 69/26 | (2006.01) |
| B32B 27/30 | (2006.01) |

(52) U.S. Cl.
CPC .............. *C09J 177/06* (2013.01); *B32B 1/08* (2013.01); *B32B 27/306* (2013.01); *B32B 27/34* (2013.01); *C08G 69/265* (2013.01); *C08G 69/36* (2013.01); *C08L 77/00* (2013.01); *C09J 177/00* (2013.01); *F16L 11/04* (2013.01); *C08L 2205/02* (2013.01); *Y10T 428/139* (2015.01); *Y10T 428/1352* (2015.01); *Y10T 428/2896* (2015.01); *Y10T 428/31725* (2015.04)

(58) Field of Classification Search
None
See application file for complete search history.

(56) References Cited

U.S. PATENT DOCUMENTS

| | | | |
|---|---|---|---|
| 3,383,369 A | | 5/1968 | Rigway et al. |
| 3,515,702 A | * | 6/1970 | Raabe .................... C08G 69/14 524/352 |
| 5,886,098 A | | 3/1999 | Ueda et al. |
| 6,555,243 B2 | | 4/2003 | Flepp et al. |
| 2004/0058111 A1 | | 3/2004 | Manas-Zloczower et al. |
| 2004/0242774 A1 | | 12/2004 | Fujimura et al. |
| 2004/0265527 A1 | | 12/2004 | Schmitz et al. |
| 2009/0252979 A1 | * | 10/2009 | Ferreiro ................... B32B 1/08 428/474.7 |
| 2014/0299220 A1 | | 10/2014 | Montanari et al. |

FOREIGN PATENT DOCUMENTS

| | | |
|---|---|---|
| EP | 0 471 566 A1 | 2/1992 |
| EP | 0 613 919 A1 | 9/1994 |
| EP | 1 162 061 A1 | 12/2001 |
| EP | 1 452 307 A1 | 9/2004 |
| EP | 1 482 011 A1 | 12/2004 |
| FR | 2 974 028 A1 | 10/2012 |
| GB | 1 129 639 A | 10/1968 |
| JP | 2004-346274 | 12/2004 |
| JP | 2004-352794 A | 12/2004 |

OTHER PUBLICATIONS

International Search Report (PCT/ISA/210) dated Feb. 27, 2014, by the European Patent Office as the International Searching Authority for International Application No. PCT/EP2014/051434.

* cited by examiner

*Primary Examiner* — Frank D Ducheneaux
(74) *Attorney, Agent, or Firm* — Buchanan Ingersoll & Rooney P.C.

(57) ABSTRACT

An adhesive composition including predominantly one or two polyamide(s) having units chosen from: at least one unit denoted A having an average number of carbon atoms per nitrogen atom, denoted $C_A$, ranging from 4 to 8.5, advantageously from 4 to 7; at least one unit denoted B having an average number of carbon atoms per nitrogen atom, denoted $C_B$, ranging from 7 to 10, advantageously from 7.5 to 9.5; and at least one unit denoted C having an average number of carbon atoms per nitrogen atom, denoted $C_C$, ranging from 9 to 18, advantageously from 10 to 18, and to the use thereof.

2 Claims, No Drawings

ADHESIVE COMPOSITION AND STRUCTURE COMPRISING AT LEAST ONE LAYER OF SAID COMPOSITION

The invention relates to an adhesive composition, also known as a binder, and to the use thereof for making structures for transferring and/or storing gases and fluids, such as fuels or biofuels, compressed air, and braking or cooling liquids.

The invention relates more particularly to the pipes present in an engine. These pipes may be intended, for example, for transporting fuel, especially from the tank to the engine, for the cooling circuit, for the hydraulic system, or may alternatively be intended for the air conditioning or compressed air circuit or for transporting a mixture of urea and water. These pipes may also be included in underframe applications.

For reasons of safety and of environmental protection, especially with the arrival of novel biofuels, motor vehicle constructors are imposing on the pipes mentioned previously particular mechanical characteristics, and also characteristics of very low permeability and of good resistance to the various constituents of fuels, which vary from country to country (hydrocarbons, additives, alcohols such as methanol and ethanol, the alcohols possibly being predominant components in certain cases), the engine lubrication oils and the other chemical products that may be encountered in this environment (battery acid, brake liquids, cooling liquids, metal salts such as calcium chloride or zinc chloride).

The characteristics of the specifications commonly required by motor vehicle constructors for a pipe to be considered satisfactory are cumulatively the following:
good and long-lasting adhesion between the layers, if the pipe is a multilayer pipe, most particularly after having been exposed to fuel;
good integrity of the connections (pipes+joints) after circulation of fuel, i.e. not leading to any leaks;
good dimensional stability of the pipe, when it is used with gasoline;
good resistance to cold shocks (from −30° C. to −40° C. approximately), so that the pipe does not break;
good heat resistance (approximately 150° C.), so that the pipe does not become deformed;
good resistance to aging in a hot oxidative medium (for example: hot air of the engine compartment, from 100 to 150° C. approximately);
good resistance to fuels and to their degradation products and especially with high contents of peroxide;
very low permeability to fuels, and more particularly good biofuel barrier properties, as regards both its polar components (such as ethanol) and its apolar components (hydrocarbons);
good flexibility of the pipe to facilitate mounting, especially of the fuel feed pipework;
good resistance to $ZnCl_2$ (for example in winter, when roads are gritted, the exterior of the pipe being exposed to this environment).

Furthermore, the desired pipes must avoid the following drawbacks:
if the pipe is a multilayer pipe, peeling of the layers, especially the inner layers, especially during the insertion of a joint (which may lead to leaks);
excessive swelling of the pipe after aging in gasoline/diesel systems (including for biodiesels or biofuels), which may lead to leaks or problems of positioning under the vehicle.

At the present time, two types of pipe exist, monolayer and multilayer pipes, i.e. pipes consisting of one or more layers of polymer.

Conventionally, the pipes used are manufactured by mono-extrusion, which is the case for a monolayer pipe, or by coextrusion of the various layers, which is the case for a multilayer pipe, according to the usual techniques for transforming thermoplastics.

To ensure good dimensional stability of a multilayer pipe, it is essential to have excellent adhesion between the various polymer layers forming the tube. Most conventionally, an adhesive layer is interposed between two polymer layers, which, by virtue of their composition, do not or do not sufficiently adhere together, to satisfy the specifications mentioned previously.

More generally, the problem to be solved is that of combining high-carbon polyamide materials, which are materials that are very flexible and very tough (in particular with regard to cold shock, aging in hot air, resistance to zinc chloride), which will generally constitute the outer part of the pipe, with barrier materials, i.e. materials that are sparingly permeable to liquids, which will constitute the inner face of the tube and occasionally come into direct contact with the liquids, such as gasoline or other fluids mentioned previously.

These barrier materials may be weakly carbonic polyamides, which are preferably semicrystalline and with a high melting point, but also non-polyamide barrier materials such as the copolymer of ethylene and vinyl alcohol (denoted EVOH below), or even functionalized fluoro materials such as functionalized polyvinylidene fluoride (PVDF), the functionalized copolymer of ethylene and tetrafluoroethylene (ETFE), the functionalized copolymer of ethylene, tetrafluoroethylene and hexafluoropropylene (EFEP), functionalized polyphenylene sulfide (PPS), or functionalized polybutylene naphthalate (PBN).

According to the present invention, the term "polyamide", also denoted PA, is directed toward:
homopolymers,
copolymers, or copolyamides, based on various amide units, for instance copolyamide 6/12 with amide units derived from lactam-6 and lactam-12.

The symbol "/" serves to, delimit the units of a copolymer.

There is also a category of copolyamides in the broad sense, which, although not preferred, forms part of the context of the invention. These are copolymers bearing PA blocks, especially copolyamides comprising not only amide units (which will be predominant, hence the fact that they should be considered as copolyamides in the broad sense), but also units of non-amide nature, for example ether units or polyolefin units. The most commonly known examples are PEBAs or polyether-block-amide, and the copolyamide-ester-ether, copolyamide-ether and copolyamide ester variants thereof. Among these, mention is made of PEBA-12 in which the polyamide units are the same as those of PA12, and PEBA-6.12 in which the polyamide units are the same as those of PA6.12.

Homopolyamides and copolyamides are also distinguished by their number of carbon atoms per nitrogen atom, given that there are as many nitrogen atoms as there are amide groups (—CO—NH—).

In the case of a homopolyamide of PA-X.Y type, the number of carbon atoms per nitrogen atom is the average of the unit X and of the unit Y.

In the case of copolyamides, the number of carbon atoms per nitrogen atom is calculated according to the same principle. The calculation is made on the molar pro rata of the various amide units.

A high-carbon polyamide is a polyamide with a high content of carbon atoms (C) relative to the nitrogen atom (N). These are polyamides with at least about 9 carbon atoms per nitrogen atom, for instance polyamide-9, polyamide-12, polyamide-11, polyamide-10.10 (PA10.10), copolyamide 12/10.T, copolyamide 11/10.T, polyamide-12.T, polyamide-6.12 (PA6.12). T represents terephthalic acid.

A weakly carbonic polyamide is a polyamide with a low content of carbon atoms (C) relative to the nitrogen atom (—NH—). These are polyamides with less than about 9 carbon atoms per nitrogen atom, for instance polyamide-6, polyamide-6.6, polyamide-4.6, copolyamide-6.T/6.6, copolyamide 6.I/6.6, copolyamide 6.T/6.I/6.6, polyamide 9.T. I represents isophthalic diacid.

In the case of a homopolyamide of PA-X.Y type, the number of carbon atoms per nitrogen atom is the average of the unit X and of the unit Y. Thus, PA6.12 is a PA containing 9 carbon atoms per nitrogen atom; in other words it is a C9 PA. PA6.13 is C9.5. PA-12.T is C10, T, i.e. terephthalic acid, being C8.

In the case of copolyamides, the number of carbon atoms per nitrogen atom is calculated according to the same principle. The calculation is made on the molar pro rata of the various amide units. Thus, coPA-6.T/6.6 60/40 mol % is C6.6: 60%×(6+8)/2+40%×(6+6)/2=6.6. In the case of a copolyamide bearing units of non-amide type, the calculation is made solely on the amide unit part. Thus, for example, PEBA-12, which is a block copolymer of 12 amide units and of ether units, the carbon number will be 12, as for PA12; for PEBA-6.12, it will be 9, as for PA6.12.

In the case of a copolyamide bearing non-amide units, the calculation is made solely on the amide unit part. Thus, for example, for PEBA-12 which is a block copolymer of 12 amide units and of ether units, the number of carbon atoms will be 12, as for PA12. For PEBA-6.12, it will be 9, as for PA6.12.

Thus, high-carbon polyamides such as polyamide PA12 or 11 do not adhere sufficiently to an EVOH polymer, to a weakly carbonic polyamide such as polyamide PA6, or to an alloy of polyamide PA6 and of polyolefin (for instance an Orgalloy® sold by the company Arkema).

However, it is observed that the structures of pipes currently proposed are not satisfactory for a use intended for biofuel, since the requirements of the motor vehicle constructors' specifications recalled above cannot all be simultaneously met.

Biofuels are not only derived from petroleum, but comprise a proportion of polar products such as alcohols of plant origin, for instance ethanol or methanol, of at least 3%. This amount may be up to 85%, or even 95%.

In addition, the fuel circulation temperature is tending to rise as a result of the new engines (more confined, running at a higher temperature).

Binders based on copolyamides are known. Document EP 1 162 061 (EMS-Chemie AG) describes, as adhesive or binder, materials based on one or more copolyamides, these copolyamides consisting of weakly carbonic units and of high-carbon units. For example, copolyamide 6/12 with relatively similar proportions of units 6 and of units 12 is used to make PA12 adhere to PA6, PA12 to EVOH, PA11 to PA6 or PA11 to EVOH.

However, it has been found that such a copolyamide-based adhesive composition suffers a large drop in adhesion in hot ethanol or on prolonged contact in polar/apolar mixtures such as hot biofuel (ethanol/gasoline based on apolar hydrocarbons).

All these binders, which are sparingly crystalline, have the drawback of tending to become dissolved and thus of losing their integrity and their mechanical cohesion in these hot fluids. The adhesion is, as a result, no longer ensured. The problem is all the more critical when the alcohol content in the gasoline increases and when the temperature increases.

Adhesive compositions that are no longer based on sparingly crystalline or non-crystalline copolyamides, but based on mixtures of more crystalline polyamides, by combining, by means of a compatibilizer, a high-carbon polyamide such as PA12 with a highly crystalline and/or barrier and weakly carbonic polyamide such as PA6 (for example in EP 1 452 307 and U.S. Pat. No. 6,555,243 from the company EMS-Chemie, in US 2004/0 058 111 from the company Saint-Gobain) lead to initial adhesion levels that are low and insufficient.

Tests were performed using mixtures of crystalline polyamides. Thus, an adhesive composition was prepared comprising 40% of PA6, 40% PA12 and 20% of compatibilizer of functionalized EPR type (Exxelor VA1801). This composition is, admittedly, more resistant to the effect of dissolution of hot biofuel, but the adhesion remains at a low or moderate level and insufficient relative to the desired results. The consequences of this poor adhesion are excessive swelling resulting from the dissociation of the layers, and also a permeability to fuels that becomes very high after immersion or circulation of fuels in the pipe, the leaktightness no longer being maintained between the layers, and possibly leading to leaks at the joint.

Starting from this observation, it thus becomes necessary to find an adhesive composition that is capable not only of offering sufficient initial adhesion but is also long-lasting, i.e. sufficient after prolonged contact in biofuel. This composition must also make it possible to obtain multilayer pipes that satisfy specifications of motor vehicle constructors, in particular during the use of biofuels.

The present invention is thus directed toward overcoming the drawbacks mentioned above and toward proposing an adhesive composition that is efficient in terms of adhesion to allow its use in multilayer structures of pipes for transferring fluids, especially fuels, whether they are conventional fuels or biofuels, even for high fluid circulation temperatures, these circulation temperatures possibly ranging from 40 to 150° C. depending on the composition of the fuel: between 60 and 90° C. for gasolines with a very high alcohol content (for example for "E85", gasoline containing 85% ethanol, which is the reference gasoline in Brazil and Sweden; for example for "E50", the typical test gasoline in Europe) and between 120 and 150° C. for gasolines with little or no alcohol content (for example lead-free gasoline).

In addition, the adhesive composition according to the invention must be able to be used irrespective of the adjacent layers forming the structure of the pipes under consideration, and not only with adjacent layers based on polyamide or EVOH, as in document US 2004/0 265 527.

The present invention is also directed toward providing multilayer structures using an adhesive composition that overcomes the drawbacks mentioned above.

Finally, the invention relates to a particular copolyamide with a high adhesive power. It has been observed that this power persists even after prolonged contact in cold or hot fluids, these fluids possibly being of polar, apolar and above all mixed nature, such as biofuels.

According to the invention, the adhesive composition predominantly comprises one or two polyamides consisting of units chosen from:
- at least one unit denoted A with a mean number of carbon atoms per nitrogen atom, denoted $C_A$, ranging from 4 to 8.5, advantageously from 4 to 7;
- at least one unit denoted B with a mean number of carbon atoms per nitrogen atom, denoted $C_B$, ranging from 7 to 10, advantageously from 7.5 to 9.5;
- at least one unit denoted C with a mean number of carbon atoms per nitrogen atom, denoted $C_C$, ranging from 9 to 18, advantageously from 10 to 18; and
- optionally at least one unit Z other than an amide unit;
- the units A, B and C being present in said polyamide or together in said polyamides;
- one of the units A, B or C being in a very predominant proportion in the copolyamide(s) and representing from 80% to 97% by weight relative to the total weight of the copolyamide,
- the mean number of carbon atoms per nitrogen atom of the units A, B and C also corresponding to the following strict inequality: $C_A<C_B<C_C$,
- the heat of fusion of the polyamide or the mass-weighted mean of the heats of fusion of the mixture of polyamides in said composition being greater than 25 J/g (DSC),
- the melting point of the or of each of the polyamides being greater than 150° C. (DSC).

The term "one or more units A, B and C" obviously covers mixtures comprising two or more of the units A, B and C as defined above.

It is preferable in the context of the present invention to have 3 polyamide units: a unit A, a unit B and a unit C. It nevertheless remains possible to have several units of the same type in the polyamide(s) of the invention, for instance polyamides of the type A, B, C and also C'; A, B, B' and C; A, A', B and C; A, B, B', C and C'; A, A', B, B', C and C' or alternatively, for example, A, B, C, C' and C", in which the units A and A', for example, correspond to the same definition of the unit A.

This adhesive composition has the advantage of being universal, i.e. of adhering to the polymer layers usually used in the design of the pipes defined above, namely, compositions based on high-carbon polyamides, such as PA11, PA12, on the one hand, and, on the other hand, compositions based on weakly carbonic polyamides such as PA6, PA6.6, compositions based on EVOH or alloys of weakly carbonic polyamides and of polyolefins.

Furthermore, it has been found that after contact with alcoholic gasolines, at elevated temperature and for a certain time (for example 80° C. for 200 hours), such as the gasoline known as E50 comprising by mass 50% of ethanol and 50% of supplemented gasoline (the gasoline possibly being, for example, of L type supplemented with 5% of water and 1% of methanol, according to the Peugeot SA constructor standard B31 5220, or being, for example, of the "fuel C" type, the latter being a mixture of isooctane and of toluene in equal parts), the adhesion remains better than the motor vehicle constructors' recommendations after a prolonged duration at high temperature.

Other subjects, aspects and characteristics of the invention will emerge on reading the description that follows.

Moreover, any range of values denoted by the expression "between a and b" represents the range of values extending from more than a to less than b (i.e. limits a and b excluded), whereas any range of values denoted by the expression "from a to b" means the range of values extending from a to b (i.e. including the strict limits a and b).

Structure of the Polyamide

The nomenclature used to define the polyamides is described in standard ISO 1874-1:1992 *"Plastics—Polyamide (PA) materials for molding and extrusion—Part 1: Designation"*, especially on page 3 (Tables 1 and 2) and is well known to those skilled in the art.

The polyamide(s) according to the invention consists of units chosen from:
- at least one unit denoted A with a mean number of carbon atoms per nitrogen atom, denoted $C_A$, ranging from 4 to 8.5, advantageously from 4 to 7;
- at least one unit denoted B with a mean number of carbon atoms per nitrogen atom, denoted $C_B$, ranging from 7 to 10, advantageously from 7.5 to 9.5; and
- at least one unit denoted C with a mean number of carbon atoms per nitrogen atom, denoted $C_C$, ranging from 9 to 18, advantageously from 10 to 18;
- optionally at least one unit Z other than an amide unit;
- the three units A, B and C being present in said polyamide or together in said polyamides;
- one of the units A, B or C in the copolyamide(s) being in very predominant proportion and representing from 80% to 97% by weight relative to the total weight of the copolyamide,
- the mean number of carbon atoms per nitrogen atom of the units A, B and C also corresponding to the following strict inequality: $C_A<C_B<C_C$.

The difference between the mean numbers of carbon atoms per nitrogen atom $(C_B-C_A)$ and/or $(C_C-C_B)$ may range from 1 to 4 and preferably from 2 to 3.

Unit A

The unit A has a ratio between the number of carbon atoms to the number of nitrogen atoms, denoted $C_A$, ranging from 4 to 8.5 and preferentially from 4 to 7.

The unit A is chosen from units derived from an amino acid, a lactam and a unit corresponding to the formula (Ca diamine).(Cb diacid), with a representing the number of carbon atoms in the diamine and b representing the number of carbon atoms in the diacid, a and b each ranging from 4 to 13, these units being chosen so as to respect the number of carbon atoms to the number of nitrogen atoms, denoted $C_A$, ranging from 4 to 8.5. The unit A may denote a mixture of the various abovementioned units.

When unit A represents a unit derived from a lactam, it may be chosen from pyrrolidinone, 2-piperidinone, caprolactam (A=6), enantholactam and caprylolactam.

When unit A represents a unit derived from a unit corresponding to the formula (Ca diamine).(Cb diacid), the unit (Ca diamine) is chosen from linear or branched aliphatic diamines, cycloaliphatic diamines and alkylaromatic diamines.

When the diamine is linear and aliphatic, of formula $H_2N\text{—}(CH_2)_a\text{—}NH_2$, the monomer (Ca diamine) is preferentially chosen from butanediamine (a=4), pentanediamine (a=5), hexanediamine (a=6), heptanediamine (a=7), octanediamine (a=8), nonanediamine (a=9), decanediamine (a=10), undecanediamine (a=11), dodecanediamine (a=12) and tridecanediamine (a=13).

When the diamine is branched and aliphatic, it may comprise, for example, one or more methyl or ethyl substituents on the main chain. For example, the monomer (Ca diamine) may be chosen advantageously from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

When the monomer (Ca diamine) is cycloaliphatic, it is preferentially chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi (cyclohexylamine) (PACP). It may also comprise the following carbon backbones: norbornylmethane, cyclohexylmethane, dicyclohexylpropane, di(methylcyclohexyl), di(methylcyclohexyl)-propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the monomer (Ca diamine) is alkylaromatic, it is preferentially chosen from 1,3-xylylenediamine and 1,4-xylylenediamine.

When unit A is a unit corresponding to the formula (Ca diamine).(Cb diacid), the unit (Cb diacid) is chosen from linear or branched aliphatic diacids, cycloaliphatic diacids and aromatic diacids.

When the monomer (Cb diacid) is linear and aliphatic, it is chosen from succinic acid (b=4), pentanedioic acid (b=5), adipic acid (b=6), heptanedioic acid (b=7), octanedioic acid (b=8), azelaic acid (b=9), sebacic acid (b=10), undecanedioic acid (b=11), dodecanedioic acid (b=12) and brassylic acid (b=13).

When the diacid is cycloaliphatic, it may comprise the following carbon backbones: norbornylmethane, cyclohexylmethane, dicyclohexylmethane, dicyclohexylpropane, di(methylcyclohexyl) and di(methylcyclohexyl)propane.

When the diacid is aromatic, it is preferentially chosen from terephthalic acid (denoted T), isophthalic acid (denoted I) and naphthalenic diacids.

Preferably, the unit A is chosen from units derived from the following monomers: 6, 4.6, 6.6, 6.T, 6.I, 9.T, 9'T, 9' denoting 2-methyl-1,8-octanediamine, i.e. the isomer of diamine-9 or 1,9-nonanediamine, 6/6.6, 6.T/6.6, 6.T/6.I/6.6. More particularly, the unit A is chosen from units derived from the following monomers: 6, 4.6 and 6.6.

Unit B

Unit B has a ratio between the number of carbon atoms to the number of nitrogen atoms, denoted $C_B$, ranging from 7 to 10 and preferentially from 7.5 to 9.5.

Unit B is chosen from units derived from an amino acid, a lactam and a unit corresponding to the formula (Cc diamine).(Cd diacid), with c representing the number of carbon atoms in the diamine and d representing the number of carbon atoms in the diacid, c and d each ranging from 4 to 16, these units being chosen so as to respect the number of carbon atoms to the number of nitrogen atoms, denoted CB, ranging from 7 to 10. Unit B may denote a mixture of the various abovementioned units.

When unit B represents a unit derived from an amino acid, it may be chosen from 9-aminononanoic acid (B=9) or 10-aminodecanoic acid (B=10).

When unit B represents a unit derived from a lactam, it may be chosen from enantholactam, caprylolactam, pelargolactam and decanolactam.

When unit B represents a unit derived from a unit corresponding to the formula (Cc diamine).(Cd diacid), the unit (Cc diamine) is chosen from linear or branched aliphatic diamines, cycloaliphatic diamines and alkylaromatic diamines.

When the diamine is linear and aliphatic, of formula $H_2N—(CH_2)_c—NH_2$, the monomer (Cc diamine) is preferentially chosen from butanediamine (c=4), pentanediamine (c=5), hexanediamine (c=6), heptanediamine (c=7), octanediamine (c=8), nonanediamine (c=9), decanediamine (c=10), undecanediamine (c=11), dodecanediamine (c=12), tridecanediamine (c=13), tetradecanediamine (c=14) and hexadecanediamine (c=16).

When the diamine is branched and aliphatic, it may comprise one or more methyl or ethyl substituents on the main chain. For example, the monomer (Cc diamine) may be chosen advantageously from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

When the monomer (Cc diamine) is cycloaliphatic, it is preferentially chosen from bis(3,5-dialkyl-4-aminocyclohexyl)methane, bis(3,5-dialkyl-4-aminocyclohexyl) ethane, bis(3,5-dialkyl-4-aminocyclohexyl)propane, bis(3,5-dialkyl-4-aminocyclohexyl)butane, bis(3-methyl-4-aminocyclohexyl)methane (BMACM or MACM), p-bis(aminocyclohexyl)methane (PACM) and isopropylidenedi (cyclohexylamine) (PACP). It may also comprise the following carbon backbones: norbornyl methane, cyclohexylmethane, dicyclohexylpropane, di(methylcyclohexyl), di(methylcyclohexyl)-propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the monomer (Cc diamine) is alkylaromatic, it is preferentially chosen from 1,3-xylylene diamine and 1,4-xylylene diamine.

When unit B represents a unit derived from a unit corresponding to the formula (Cc diamine).(Cd diacid), the unit (Cd diacid) is chosen from linear or branched aliphatic diacids, cycloaliphatic diacids and aromatic diacids.

When the monomer (Cd diacid) is linear and aliphatic, it is preferentially chosen from succinic acid (d=4), pentanedioic acid (d=5), adipic acid (d=6), heptanedioic acid (d=7), octanedioic acid (d=8), azelaic acid (d=9), sebacic acid (d=10), undecanedioic acid (d=11), dodecanedioic acid (d=12), brassylic acid (d=13), tetradecanedioic acid (d=14) and hexadecanedioic acid (d=16).

When the diacid is cycloaliphatic, it may comprise the following carbon backbones: norbornyl methane, cyclohexylmethane, di cyclohexylmethane, dicyclohexylpropane, di(methylcyclohexyl), di(methylcyclohexyl)propane.

When the diacid is aromatic, it is preferentially chosen from terephthalic acid (denoted T), isophthalic acid (denoted I) and naphthalenic diacids.

Preferably, unit B represents a unit chosen from the following monomers: 6.10, 6.12, 9.T and 9'.T, 6.14, 6.10/6.12. More particularly, unit B denotes the monomer 6.10 or 6.12.

Unit C

Unit C has a ratio between the number of carbon atoms to the number of nitrogen atoms, denoted $C_C$, ranging from 9 to 18 and preferentially from 10 to 18.

Unit C is chosen from units derived from an amino acid, a lactam and a unit corresponding to the formula (Ce diamine).(Cf diacid), with e representing the number of carbon atoms in the diamine and f representing the number of carbon atoms in the diacid, e and f each ranging from 4 to 32, these units being chosen so as to respect the number of carbon atoms to the number of nitrogen atoms, denoted $C_B$, ranging from 9 to 18. Unit C may denote a mixture of the various abovementioned units.

When unit C represents a unit derived from an amino acid, it may be chosen from 9-aminononanoic acid (C=9), 10-aminodecanoic acid (C=10), 10-aminoundecanoic acid (denoted 11), 12-aminododecanoic acid (C=12) and 11-aminoundecanoic acid (C=11), and also derivatives thereof, especially N-heptyl-11-aminoundecanoic acid.

When unit C represents a unit derived from a lactam, it may be chosen from pelargolactam, decanolactam, undecanolactam, and lauryllactam (C=12).

When unit C represents a unit derived from a unit corresponding to the formula (Ce diamine).(Cf diacid), the unit (Ce diamine) is chosen from linear or branched aliphatic diamines, cycloaliphatic diamines and alkylaromatic diamines.

When the diamine is linear and aliphatic, of formula $H_2N—(CH_2)e-NH_2$, the monomer (Ce diamine) is preferentially chosen from butanediamine (e=4), pentanediamine (e=5), hexanediamine (e=6), heptanediamine (e=7), octanediamine (e=8), nonanediamine (e=9), decanediamine (e=10), undecanediamine (e=11), dodecanediamine (e=12), tridecanediamine (e=13), tetradecanediamine (e=14), hexadecanediamine (e=16), octadecanediamine (e=18), octadecenediamine (e=18), eicosanediamine (e=20), docosanediamine (e=22) and the diamines obtained from fatty acids.

When the diamine is branched and aliphatic, it may comprise one or more methyl or ethyl substituents on the main chain. For example, the monomer (Ce diamine) may be chosen advantageously from 2,2,4-trimethyl-1,6-hexanediamine, 2,4,4-trimethyl-1,6-hexanediamine, 1,3-diaminopentane, 2-methyl-1,5-pentanediamine and 2-methyl-1,8-octanediamine.

When the monomer (Ce diamine) is cycloaliphatic, it is preferentially chosen from bis(3,5-dialkyl-4-aminocyclohexyl)methane, bis(3,5-dialkyl-4-aminocyclohexyl)ethane, bis(3,5-dialkyl-4-aminocyclohexyl)propane, bis(3,5-dialkyl-4-amino cyclohexyl)butane, bis(3-methyl-4-aminocyclohexyl)methane (BMACM or MACM), p-bis(aminocyclohexyl)methane (PACM) and isopropylidenedi(cyclohexylamine) (PACP). It may also comprise the following carbon backbones: norbornyl methane, cyclohexylmethane, dicyclohexylpropane, di(methylcyclohexyl), di(methylcyclohexyl)-propane. A non-exhaustive list of these cycloaliphatic diamines is given in the publication "Cycloaliphatic Amines" (Encyclopaedia of Chemical Technology, Kirk-Othmer, 4th Edition (1992), pp. 386-405).

When the monomer (Ce diamine) is alkylaromatic, it is preferentially chosen from 1,3-xylylene diamine and 1,4-xylylene diamine.

When unit C is a unit corresponding to the formula (Ce diamine).(Cf diacid), the unit (Cf diacid) is chosen from linear or branched aliphatic diacids, cycloaliphatic diacids and aromatic diacids.

When the monomer (Cf diacid) is linear and aliphatic, it is preferentially chosen from succinic acid (f=4), pentanedioic acid (f=5), adipic acid (f=6), heptanedioic acid (f=7), octanedioic acid (f=8), azelaic acid (f=9), sebacic acid (f=10), undecanedioic acid (f=11), dodecanedioic acid (f=12), brassylic acid (f=13), tetradecanedioic acid (f=14), hexadecanedioic acid (f=16), octadecanedioic acid (f=18), octadecenedioic acid (f=18), eicosanedioic acid (f=20), docosanedioic acid (f=22) and fatty acid dimers containing 36 carbons.

The fatty acid dimers mentioned above are dimerized fatty acids obtained by oligomerization or polymerization of unsaturated monobasic fatty acids bearing a long hydrocarbon-based chain (such as linoleic acid and oleic acid), as described especially in document EP 0 471 566.

When the diacid is cycloaliphatic, it may comprise the following carbon backbones: norbornyl methane, cyclohexylmethane, dicyclohexylmethane, dicyclohexylpropane, di(methylcyclohexyl), di(methylcyclohexyl)propane.

When the diacid is aromatic, it is preferentially chosen from terephthalic acid (denoted T), isophthalic acid (denoted I) and naphthalenic diacids.

Unit C represents a unit chosen from the derivatives of the following monomers: 12, 11, 10.10, 10.12, 6.18, 10.T, 12.T, 12/10.T, 12.12, 10.10/10.12 and 10.10/10.T. More particularly, unit C denotes the monomer 12, 11, 10.10 or 10.12.

The units used for the polyamide(s) of the composition according to the invention are preferably aliphatic polyamides.

Heat of Fusion

The heat of fusion of the polyamide or the mass-weighted mean of the heats of fusion of the mixture of polyamides according to the invention in said composition is greater than 25 J/g (DSC), measured by DSC in accordance with standard ISO 11357.

Thus, the polyamide(s) according to the invention are subjected to a first heating from 20° C./min up to a temperature of 340° C., followed by cooling at 20° C./min to a temperature of 20° C., and then a second heating of 20° C./min up to a temperature of 340° C., the heat of fusion being measured during this second heating.

Preferably, the heat of fusion ranges from 30 J/g to 60 J/g.

Melting Point

The melting point of the or of each of the polyamides is greater than 150° C., measured by DSC (Differential Scanning calorimetry) in accordance with standard ISO 11357.

Preferably, the melting point ranges from 155 to 300° C.

Preferably, the melting point of the homopolyamide consisting of unit A is greater than or equal to 210° C.

Preferably, the melting point of the homopolyamide consisting of unit C is less than 200° C.

Contents

Preferably, the predominant unit A, B or C represents from 85% to 95% by weight relative to the total weight of amide units in the polymer (whether the polyamide consists solely of amide units or not (in the case of A/B/C/Z, Z being a PEBA, for example)).

It is recalled that the term "polyamide" includes homopolyamides and copolyamides, and that the copolyamides include terpolyamides.

Unit Z

The polyamide(s) according to the invention may comprise at least one unit Z other than an amide unit. Preferably, this unit is chosen from ether, ester and α-olefin units. In other words, the polyamide(s) according to the invention may comprise a polyether (PE), polyester or polyolefin block.

Ether Units

The PE block comprises alkylene oxide units. These units may be ethylene oxide, propylene oxide or tetrahydrofuran units (which leads to polytetramethylene glycol sequences). Advantageously, said PE block included in the copolymer according to the invention is chosen from polyethylene glycol (PEG), i.e. consists of ethylene oxide units, polypropylene glycol (PPG), i.e. consists of propylene oxide units, polytetramethylene glycol (PTMG), i.e. consists of tetramethylene glycol units, and copolymers thereof. The copolymer according to the invention may comprise several types of polyethers, the copolyethers possibly being in block or random form.

Use may also be made of blocks obtained by oxyethylation of bisphenols, for instance bisphenol A. These latter products are described in patent EP 613 919.

The polyether blocks may also consist of ethoxylated primary amines. Examples of ethoxylated primary amines that may be mentioned include the products of formula:

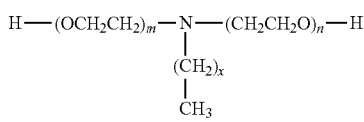

in which m and n are between 1 and 20 and x is between 8 and 18. These products are commercially available under the brand name Noramox® from the company CECA and under the brand name Genamin® from the company Clariant.

The polyether (PE) blocks may comprise polyoxyalkylene blocks with $NH_2$ chain ends, such blocks possibly being obtained by cyanoacetylation of aliphatic α,ω-dihydroxylated polyoxyalkylene blocks known as polyetherdiols. More particularly, use may be made of the Jeffamine products (for example Jeffamine® D400, D2000, ED 2003, XTJ 542, commercial products from the company Huntsman, also described in patents JP 2004/346 274, JP 2004/352 794 and EP 1 482 011).

Ester Units

The polyester (PES) block that may be used according to the invention is a polyester obtained by polycondensation between a dicarboxylic acid and a diol. The appropriate carboxylic acids include those mentioned above used for forming the polyamide blocks with the exception of aromatic acids, such as terephthalic acid and isophthalic acid. The appropriate diols comprise linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane and 1,4-cyclohexanedimethanol. An example of a polyester used is the polyadipate family.

The term "polyesters" also means poly(caprolactone) and PESs based on fatty acid dimers, in particular the products of the Priplast® range from the company Uniqema.

A PES block of alternating, random or block "copolyester" type, containing a sequence of at least two types of PES mentioned above, may also be envisaged.

Polyolefin Unit

The polyolefin (PO) block that may be used according to the invention is a polymer comprising as monomer an α-olefin, i.e. homopolymers of an olefin or copolymers of at least one α-olefin and of at least one other copolymerizable monomer, the α-olefin advantageously containing from 2 to 30 carbon atoms.

Examples of α-olefins that may be mentioned include ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicocene, 1-docoene, 1-tetracocene, 1-hexacocene, 1-octacocene, and 1-triacontene. These α-olefins may be used alone or as a mixture of two or more than two.

Examples that may be mentioned include:
ethylene homopolymers and copolymers, in particular low-density polyethylene (LDPE), high-density polyethylene (HDPE), linear low-density polyethylene (LLDPE), very low-density polyethylene (VLDPE), and polyethylene obtained by metallocene catalysis,
propylene homopolymers and copolymers,
essentially amorphous or attactic poly-α-olefins (APAO),
ethylene/α-olefin copolymers such as ethylene/propylene, EPR (ethylene-propylene-rubber) and EPDM (ethylene-propylene-diene) elastomers, and mixtures of polyethylene with an EPR or an EPDM,
styrene/ethylene-butene/styrene (SEBS), styrene/butadiene/styrene (SBS), styrene/isoprene/styrene (SIS) and styrene/ethylene-propylene/styrene (SEPS) block copolymers,
copolymers of ethylene with at least one product chosen from salts or esters of unsaturated carboxylic acids, for instance alkyl (meth)acrylates, the alkyl possibly containing up to 24 carbon atoms, vinyl esters of saturated carboxylic acids, for instance vinyl acetate or propionate, and dienes, for instance 1,4-hexadiene or polybutadiene.

According to one advantageous embodiment of the invention, said at least one polyolefin block comprises a polyisobutylene and/or polybutadiene, which is optionally hydrogenated.

Preferably, the predominant unit Z represents from 0% to less than 50% by weight relative to the total weight of the polyamide.

Preferably, the polyamide(s) according to the invention comprise only amide units.

Preferably, the polyamide or the two polyamides according to the invention denote(s) a terpolyamide, a homopolyamide combined with a copolyamide or two copolyamides.

First Embodiment

For the purposes of the present invention, the term "terpolyamide" means a copolyamide consisting of units A, B and C.

According to a first embodiment of the invention, the polyamide included in the adhesive composition of the invention is a terpolyamide consisting of the three above-mentioned units A, B and C.

As outlined above, the terpolyamide according to the invention may comprise more than three different units, but these units must necessarily be units A, B and C as described above. The terpolyamide may be, for example, of the following structure: A/B/C, A/A'/B/B'/C/C' or A/A'/A"/B/C.

Preferably, the terpolyamide according to the invention comprises only one unit A, only one unit B and only one unit C.

Preferably, unit B is the predominant unit, and is present in a proportion representing from 85% to 95% by weight relative to the total weight of the terpolyamide.

Preferably, the amide unit A is chosen from units derived from the following monomers: 6, 4.6, 6.6, 6.T, 9.T and 9'.T, 9' denoting 2-methyl-1,8-octanediamine;
the amide unit B is chosen from units derived from the following monomers: 6.10, 6.12, 9.T and 9'.T, preferably 6.10, and
the amide unit C is chosen from units derived from the following monomers: 10.10, 11, 12, 10.12, 6.18, 10.T, 12.T, 12/10.T, 12.12 and 10.10/10.T.

More particularly, the amide unit A is chosen from units derived from the following monomers: 6, 4.6 and 6.6;
the amide unit B is chosen from units derived from the following monomers: 6.10, 6.12, preferably 6.10, and
the amide unit C is chosen from units derived from the following monomers: 10.10, 11, 12, 10.12, 12.12 and 6.18.

The preferred terpolyamide is chosen from PA 6/6.10/12, PA 6/6.12/12 and PA 6.6/6.10/12.

Second Embodiment

According to a second embodiment of the invention, the polyamides included in the adhesive composition of the invention are a mixture of two different copolyamides each consisting of two units chosen from the abovementioned units A, B and C.

Thus, this embodiment covers the following combinations of copolyamides: PA A/B+PA A/C; PA A/B+PA B/C and PA A/C+PA B/C or alternatively PA A/B+PA A'/C; PA A/B+PA B'/C and PA A/C+PA B/C'.

Preferably, the preferred combination is that in which unit B is present in the two copolyamides, namely the combination PA A/B+PA B/C.

Preferably, in this particular combination, unit A is the predominant unit in the copolyamide A/B and unit C is the predominant unit in the copolyamide B/C.

Preferably, the amide unit A is chosen from units derived from the following monomers: 6, 4.6, 6.6, 6.T, 9.T and 9'.T;

the amide unit B is chosen from units derived from the following monomers: 6.10, 6.12, 9.T and 9'.T, preferably 6.10, and the amide unit C is chosen from units derived from the following monomers: 10.10, 11, 12, 10.12, 6.18, 10.T, 12.T, 12/10.T, 12.12 and 10.10/10.T.

More particularly, the amide unit A is chosen from units derived from the following monomers: 6, 4.6 and 6.6;

the amide unit B is chosen from units derived from the following monomers: 6.10, 6.12, preferably 6.10, and the amide unit C is chosen from units derived from the following monomers: 10.10, 11, 12, 10.12, 12.12 and 6.18.

Preferably, the preferred combinations are PA6.6/6.10 and PA6.12/12; PA6/6.12 and PA6.12/12; and finally PA6/6.10 and PA6.10/12.

Third Embodiment

According to a third embodiment of the invention, the polyamides included in the adhesive composition of the invention are a mixture of a copolyamide consisting of two units chosen from the abovementioned units A, B and C and of a homopolyamide consisting of the unit that is absent from the copolyamide.

Thus, this embodiment covers the following combinations of copolyamides: PA A/B+PA C; PA A/C+PA B and PA B/C+PA A.

In the case of the combination PA A/B+PA C, unit A is preferentially the predominant unit in the copolyamide A/B.

In the case of the combination PA B/C+PA A, unit C is preferentially the predominant unit in the copolyamide B/C.

More particularly, the preferred combination is PA B/C+PA A, i.e. a homopolyamide predominantly comprising units A, and more particularly only one unit A, combined with a copolyamide B/C, unit B being the predominant unit in the copolyamide B/C.

Preferably, the amide unit A is chosen from units derived from the following monomers: 6, 4.6, 6.6, 6.T, 9.T and 9'.T;

the amide unit B is chosen from units derived from the following monomers: 6.10, 6.12, 9.T and 9'.T, preferably 6.10, and the amide unit C is chosen from units derived from the following monomers: 10.10, 11, 12, 10.12, 6.18, 10.T, 12.T, 12/10.T, 12.12 and 10.10/10.T.

More particularly, the amide unit A is chosen from units derived from the following monomers: 6, 4.6 and 6.6;

the amide unit B is chosen from units derived from the following monomers: 6.10, 6.12, preferably 6.10, and the amide unit C is chosen from units derived from the following monomers: 10.10, 11, 12, 10.12, 12.12 and 6.18.

More particularly, the preferred combinations are PA6 and PA6.12/12 and PA6 and PA6.10/12.

It would not constitute a departure from the context of the present invention if the homopolyamide were replaced with a copolyamide comprising in very minor amount a unit of the same type as the predominant unit, for instance a copolyamide PA A/A', PAB/B' or PA C/C'.

The homopolyamides and copolyamides used in the embodiments described above may comprise a unit other than an amide unit. Thus, it is possible to envisage a terpolyamide having the following structure: A/B/C/Z, Z denoting a unit other than an amide unit, a mixture of two different copolyamides each consisting of two units chosen from the abovementioned units A, B and C and of a unit Z other than an amide unit.

Thus, this embodiment covers the following combinations of copolyamides: PA A/B/Z+PA A/C; PA A/B+PA A/C/Z; PA A/B/Z+PA B/C; PA A/B+PA B/C/Z; PA A/C/Z+PA B/C and PA A/C+PA B/C/Z;

a mixture of a copolyamide consisting of two units chosen from the abovementioned units A, B and C, of a homopolyamide consisting of the unit that is absent from the copolyamide and of a unit Z other than an amide unit.

Thus, this embodiment covers the following combinations of copolyamides: PA A/B/Z+PA C; PA A/C/Z+PA B; PA B/C/Z+PA A; PA A/B+PA C/Z; PA A/C+PA B/Z and PA B/C+PA A/Z.

Preferably, the polyamide(s) according to the invention comprise only amide units.

Nature of the Possible Additives

Thus, the composition may comprise up to 30% by weight, relative to the total weight of the composition, of an impact modifier consisting of a non-rigid polymer with a flexural modulus of less than 100 MPa measured according to standard ISO 178.

This non-rigid polymer is preferably as supple as possible and has the lowest possible glass transition temperature Tg, i.e. less than 0° C. This impact modifier is, if need be, chemically functionalized so as to be able to react with the polyamides A, B and C and to form an alloy that is compatible therewith.

According to the invention, the impact modifier preferably consists of one or more polyolefins, some or all thereof bearing a function chosen from carboxylic acid, carboxylic anhydride and epoxide functions or any other function that is capable of reacting chemically with the polyamides, typically with its amine chain ends (which is the case for carboxylic acid and carboxylic anhydride) or its acid chain ends (which is the case for epoxide, in particular glycidyl methacrylate).

For example, the polyolefin is chosen from:

a copolymer of ethylene and propylene of elastomeric nature (EPR), an ethylene-propylene-diene copolymer of elastomeric nature (EPDM) and an ethylene/alkyl (meth)acrylate copolymer.

Among the impact modifiers, mention is made of anhydride-grafted EPR such as Exxelor VA1803 from Exxon, or the copolymer of polyethylene, ethyl acrylate and maleic anhydride (coPE/EA/MAH) such as Lotader 4700 from the company Arkema.

Polyolefin

The adhesive composition may also comprise up to 45% by weight, relative to the total weight of the composition, of a crystalline polymer with a flexural modulus, measured according to standard ISO 178, of greater than 300 MPa and advantageously greater than 800 MPa.

This crystalline polymer is preferably a semicrystalline rigid polyolefin, or a mixture of semicrystalline rigid polyolefins, bearing, totally or partially, a function chosen from carboxylic acid, carboxylic anhydride and epoxide functions.

Preferably, the polyolefin, or the mixture of polyolefins, is chosen from high-density polyethylenes and homopolymeric or sparingly copolymerized polypropylenes.

When it is a polyolefin with a high degree of crystallinity, it may be, for example, a high-density polyethylene, denoted HDPE, or a functionalized high-density polyethylene, denoted HDPE, functionalized with a reactive group that can react with one of the chain ends (or other reactive functions) of the polyamide; this function is typically an anhydride function, or a high-density polypropylene (PP), typically a linear rigid PP, of homopolymeric or very slightly copolymerized type.

The composition may also comprise up to 20% by weight, relative to the total weight of the composition, of a plasticizer.

Other Additives

The composition may also comprise up to 45% by weight, relative to the total weight of the composition, of an additive chosen from antistatic fillers, nucleating agents, lubricants, colorants, pigments, optical brighteners, antioxidants and stabilizers.

The usual stabilizers used with polymers are phenols, phosphites, UV absorbers, stabilizers of the HALS type (hindered-amine light stabilizer), metal iodides, etc. Mention may be made of Irganox 1010, 245, 1098, Irgafos 168, Tinuvin 312, Iodide P201 from the company Ciba.

Peel Strength

The composition according to the invention preferably has a peel strength of greater than 60 N/cm. The adhesion test under consideration is performed on a pipe 8 mm in diameter and 1 mm thick. One of the layers is peeled off by subjecting it to traction at an angle of 90° and at a speed of 50 mm/min.

Thus, advantageously, the adhesive composition according to the invention has an adhesion force of at least 60 N/cm, when it is between a layer of PA 12 and a layer of PA6 or of EVOH, and of at least 10 N/cm, preferably at least 20 N/cm, after a residence time of 72 hours at 80° C. in a mixture of E50 type biofuel (corresponding to a mixture comprising by mass 50% of ethanol and 50% of supplemented gasoline (the gasoline possibly being, for example, of L type supplemented with 5% of water and 1% of methanol, according to the Peugeot SA constructor standard B31 5220, or being, for example, of the "Fuel C" type, the latter being a mixture of isooctane and of toluene in equal parts); the adhesion remains greater than the motor vehicle constructors' recommendations.

Thus, this adhesion test under difficult conditions (immersion in a biofuel for a long time and at high temperature) is one of the characteristics required for resolving the posed technical problem.

Furthermore, in order to ensure good properties (flexibility, burst strength, tear strength, transparency, rheology, transformability into pipe or a film, nucleation, crystallization, morphology, alloying, compatibilization, homogeneity, consistency, adhesion) and, in particular, good properties of resistance to impacts and to impacts after aging (especially high-temperature oxidative aging), it is possible to add to the adhesive composition an impact-modifying compatibilizer of elastomeric and preferentially polar nature.

Use

The invention relates to the use of the adhesive composition as defined above for making structures for transferring and/or storing fluids, in particular a fluid chosen from an oil, a brake liquid, a cooling liquid, a urea solution, a hydrocarbon, a diesel, a gasoline, in particular a gasoline comprising a high proportion of alcohols such as ethanol, compressed air.

The invention also relates to the use of the composition as defined above as an adhesive layer in a multilayer structure.

A subject of the invention is also a monolayer structure predominantly comprising at least one composition as defined above.

Structure

The symbol "//" serves to delimit the layers of a multilayer structure.

Finally, the invention relates to a multilayer structure, i.e. a structure comprising at least two layers, one of the two layers, known as the adhesive layer or binder, denoted (I), being formed from an adhesive composition as defined above.

According to a first embodiment of the invention, the second layer is a layer known as the barrier layer (II).

According to a first advantageous variant of the invention, the barrier layer (II) may be formed by a composition comprising at least one polymer that is a barrier to biofuels, preferably chosen from EVOH, weakly carbonic polyamide, i.e. in which the ratio of the number of carbon atoms to the number of nitrogen atoms ranges from 4 to 7, and a mixture thereof.

Thus, in a two-layer structure or a multilayer structure, the second layer may comprise a barrier material, which may be chosen from:
  either a composition comprising a copolymer of ethylene and vinyl alcohol (EVOH),
  or weakly-carbonic polyamides, for example amorphous weakly carbonic polyamides of high Tg (80-200° C.).

According to a second advantageous variant of the invention, the barrier layer (II) may be formed by a composition comprising a weakly carbonic polyamide, as explained above, and a crystalline polymer with a flexural modulus, measured according to standard ISO 178, of greater than 300 MPa, advantageously greater than 800 MPa.

Preferably, the crystalline polymer is a rigid semicrystalline polyolefin, or mixture of polyolefins, with a flexural modulus, measured according to standard ISO 178, of greater than 300 MPa, the rigid polyolefin bearing, totally or partially, a function chosen from carboxylic acid, carboxylic anhydride and epoxide functions.

For example, the following composition may be used: an alloy composed of a matrix made of polyamide 6 of Mn 18 000 (for example Ultramid B27 from the company BASF), and 30% of HDPE (high-density polyethylene) with a density of 0.96 and a melt flow index of 0.3 (at 190° C. under 2.16 kg), 7% of HDPE functionalized by grafting 1% of maleic anhydride, with a melt flow index of 1 (at 190° C. under 2.16 kg), 1.2% of organic stabilizers (consisting of 0.8% of phenol Lowinox 44B25 from the company Great Lakes), 0.2% of phosphite Irgafos 168 from the company Ciba, 0.2% of anti-UV agent (Tinuvin 312 from the company Ciba), the whole making 100%.

Other compositions are envisagable for making the barrier layer (II).

According to a third advantageous variant of the invention, polymer-based compositions may also be envisaged, these polymers preferably being functionalized with anhydride or with another function that is reactive with the amine or acid chain ends. Mention may be made in a nonlimiting manner of fluoro polymers, such as polyvinylidene fluoride (PVDF), the copolymer of ethylene and of tetrafluoroethylene (ETFE), the copolymer of ethylene, of tetrafluoroethylene and of hexafluoropropylene (EFEP), or nonfluoro polymers such as polyphenylene sulfide (PPS), polybutylene naphthalate (PBN). These fluoro polymers (PVDF, ETFE, EFEP) and nonfluoro polymers (PPS, PBN) will preferentially be functionalized.

The adhesive layer (I) and barrier layer (II) of the two-layer or multilayer structures that have just been described show excellent adhesion to each other, which adhesion is not deteriorated even by prolonged residence in a gasoline comprising alcohols (biofuel).

In addition, this barrier layer (II), in its three variants described above, is very sparingly permeable to liquids, and especially to fuels. Consequently, this layer (II) is generally at the end of the structure, in contact with the liquids or subjacent to a layer that is in contact with the liquids.

According to this particular embodiment formed by the two-layer structure (I)/(II), the adhesive layer (I) may have long-lasting properties. It may then constitute the outer layer or support for the two-layer structure.

According to a second embodiment of the invention, the structure comprises at least a third layer, known as the "long-lasting layer" (III), the adhesive layer (I) according to the invention being arranged between said long-lasting layer (III) and the barrier layer (II) and adhering to the respective zone of contact thereof.

Thus, the multilayer structure may consist of three layers, in the following successive order:
  a long-lasting layer (III) comprising the long-lasting materials as defined below,
  an adhesive layer (I) comprising the adhesive composition according to the invention, and
  a barrier layer (II) comprising the barrier materials as defined above.

The long-lasting layer (III) may be formed from a composition comprising high-carbon polyamide, i.e. in which the ratio of the number of carbon atoms to the number of nitrogen atoms ranges from 10 to 18 as explained above. Specifically, the high-carbon polyamide offers noteworthy properties such as noteworthy longevity, especially noteworthy resistance to aging and to degradation in corrosive, humid and oxidative media, for instance resistance in hot air or in hot chemical products. The high-carbon polyamide has great resistance to stress cracking, to zinc chloride and to chemical products in general. The high-carbon polyamide also has good dimensional stability in media of variable humidity. It is also resistant to impacts.

Preferably, the high-carbon polyamide is chosen from PA11, PA12, PA10.10, PA10.12, PA12/10.T, PA10.10/10.T and mixtures thereof.

The long-lasting layer (III) comprising the high-carbon polyamide defined above may also be chosen to constitute the support or outer layer of the multilayer structure.

On the basis of these three types of layers, the long-lasting layer (III), the adhesive layer (I) and the barrier layer (II), it is possible to produce numerous structures that may comprise up to 6 layers, using additional barrier, adhesive or long-lasting layers.

It is possible, according to a third embodiment of the invention, to use two layers of barrier materials, for instance a layer of a copolymer of ethylene and vinyl alcohol (EVOH) and a layer of a weakly carbonic polyamide combined with a particular polyolefin, the combination of these two barrier layers having synergistic properties.

According to a fourth embodiment of the invention, the structure comprises, in the following order:
  a third layer, known as the long-lasting layer (III),
  the adhesive layer (I) comprising the adhesive composition according to the invention,
  a second layer, known as the barrier layer (II),
  a fourth layer (IV),
the layers adhering together via the respective zone of contact thereof.

Preferably, the structure may comprise the following successive layers:
  a third long-lasting layer (III) formed from a composition comprising polyamide C,
  the adhesive layer (I) comprising the adhesive composition according to the invention,
  a second barrier layer (II) formed from a composition comprising EVOH, and
  a fourth layer formed from a composition comprising weakly carbonic polyamide.

The composition comprising the weakly carbonic polyamide of the barrier layer (II) and/or of the fourth layer (IV) may also comprise at least one rigid semicrystalline polyolefin, or mixture of polyolefins, with a flexural modulus, measured according to standard ISO 178, of greater than 300 MPa.

Structures of this type have the advantage of having a particularly high barrier effect toward biofuel with minor contents of ethanol.

It is also possible, according to a fifth embodiment of the invention, to reinforce the outer part of the structure by inserting, between the adhesive layer (I) and the first long-lasting layer (III), a second long-lasting layer as defined above, for example a long-lasting layer with improved impact strength, said second long-lasting layer adhering to the adjacent layers on the respective zone of contact thereof.

Moreover, it turns out that the adhesive layer (I) may also have the properties of a barrier material. Consequently, it is possible, according to a sixth embodiment of the invention, to position it at an end of the structure and in contact with the liquids, and to do so
  in a two-layer structure in combination with a long-lasting layer,
  in a three-layer structure, or
  in a four-layer structure.

According to a seventh embodiment of the invention, it is also possible to envisage the following structure comprising the following 5 successive layers:
  long-lasting layer (III),
  adhesive layer (I),
  barrier layer (II),
  adhesive layer (I),
  barrier layer (II),
the layers adhering together via the respective zone of contact thereof.

According to an eighth embodiment of the invention, the long-lasting layer (III) may also be at each of the ends of the structure. These structures have better resistance to $ZnCl_2$ and to peroxide media (rancid gasoline or gas oil). These structures also have the advantage of having better impact strength performance. For example, this structure may be a three-layer structure, thus leading to symmetrical structures.

According to a ninth embodiment of the invention, it is possible to make symmetrical structures comprising, for example, the following succession of layers:
  a long-lasting layer (III),
  an adhesive layer (I) according to the invention,
  a barrier layer (II),
  a second adhesive layer (I),
  a second long-lasting layer (III),
the layers adhering together via the respective zone of contact thereof.

Preferably, the structure comprises the following five successive layers:
- a long-lasting layer (III) formed from a composition comprising high-carbon polyamide,
- the adhesive layer denoted (I),
- a barrier layer (II) formed from a composition comprising EVOH,
- another adhesive layer (I), and
- a long-lasting layer (III) formed from a composition comprising high-carbon polyamide, the layers adhering together via the respective zone of contact thereof.

The thickness of the adhesive layer (I) advantageously ranges from 25 to 1000 μm and preferably from 25 to 150 μm, when it serves as binder.

The structures described above may be in the form of a pipe, a container, a film or a plate.

When these structures are in the form of a pipe, they may be used for transporting and storing fluids, especially present in vehicles, especially for transporting polar and/or apolar liquids, for instance an oil, a brake liquid, a urea solution, a glycol-based cooling liquid, fuels, such as polar or apolar fuels, diesel, biodiesel, i.e. apolar hydrocarbons and esters, in particular gasoline, most particularly biofuel, i.e. apolar hydrocarbons and alcohol such as ethanol and methanol, and compressed air.

Such structures are particularly advantageous for transporting gasoline, biofuel, biodiesel and cooling liquid, conventionally based on glycol, and a mixture of urea and water.

The invention relates finally to a polyamide consisting of the following units:
- a unit denoted A with a mean number of carbon atoms per nitrogen atom, denoted $C_A$, ranging from 4 to 8.5, advantageously from 4 to 7;
- a unit denoted B with a mean number of carbon atoms per nitrogen atom, denoted $C_B$, ranging from 7 to 10, advantageously from 7.5 to 9.5; and
- a unit denoted C with a mean number of carbon atoms per nitrogen atom, denoted $C_C$, ranging from 9 to 18, advantageously from 10 to 18;
- optionally at least one unit Z other than an amide unit;
- one of the units A, B or C being in very predominant proportion in the polyamide and representing from 80% to 97% by weight relative to the total weight of the polyamide,
- the mean number of carbon atoms per nitrogen atom of the units A, B and C also corresponding to the following strict inequality: $C_A<C_B<C_C$,
- the heat of fusion of the polyamide being greater than 25 J/g (DSC),
- the heat of fusion of the polyamide being greater than 150° C. (DSC).

The units A, B and C are as defined above.

Preferably, the polyamide according to the invention consists of a single unit A, of a single unit B and of a single unit C.

Preferably, unit B is the very predominant unit in the polyamide according to the invention.

The examples that follow serve to illustrate the invention without, however, being limiting in nature.

EXAMPLES

1/When the Composition According to the Invention Comprises a Terpolyamide Consisting of Units A, B and C 1.1 Preparation of the Compositions The compositions according to the invention given in Table 1 were prepared from the following components. The amounts of products are expressed as weight percentages relative to the total weight of the composition.

PA 6/6.12/12 (6%/88%/6%) denotes a copolyamide 6/6.12/12 of mass composition 6%/88%/6%, with an MFI at 235° C. under 5 kg of 5, a melting point of 188° C. and a heat of fusion of 55 J/g.

PA 6/6.10/12 (6%/88%/6%) denotes a copolyamide 6/6.10/12 of mass composition 6%/88%/6%, with an MFI at 235° C. under 5 kg of 8, a melting point of 189° C. and a heat of fusion of 53 J/g.

PA 6/6.12/12 (85%/5%/10%) denotes a copolyamide 6/6.12/12 of mass composition 85%/5%/10%, with an MFI at 235° C. under 5 kg of 6, a melting point of 189° C. and a heat of fusion of 55 J/g.

PA 6/6.12/12/10.10 denotes a copolyamide 6/6.12/12/10.10 of mass composition 6%/88%/3%/3%, with an MFI at 235° C. under 5 kg of 6, a melting point of 186° C. and a heat of fusion of 50 J/g.

PA 6.T/6.12/12 (6%/88%/6%) denotes a copolyamide 6.T/6.12/12 of mass composition 6%/88%/6%, with an MFI at 235° C. under 5 kg of 3.

Stab1 denotes a mixture of organic stabilizers consisting of 0.8% of phenol Lowinox 44B25 from the company Great Lakes and of 0.2% of phosphite Irgafos 168 from the company Ciba.

EPR1 denotes a copolymer of ethylene and propylene of elastomeric nature functionalized with a group that is reactive with an anhydride function (at 0.5-1% by mass), with an MFI of 9 (at 230° C., under 10 kg), of Exxellor VA1801 type from the company Exxon used as impact modifier. Its flexural modulus is 10 MPa approximately according to standard ISO178.

Plasticizing or BBSA denotes benzyl butyl sulfonamide (BBSA).

The comparative compositions given in Table 2 were prepared from the following components.

PA 6/6.10/12 (20%/20%/60%) denotes a copolyamide 6/6.10/12 of mass composition 20%/20%/60%, with an MFI at 235° C. under 5 kg of 5, a melting point of 128° C. and a heat of fusion of 23 J/g.

PA 6/6.10/12 (18%/58%/24%) denotes a copolyamide 6/6.10/12 of mass composition 18%/58%/24%, with an MFI at 235° C. under 5 kg of 5, a melting point of 144° C. and a heat of fusion of 42 J/g.

PA 6/6.10/12 (60%/10%/30%) denotes a copolyamide 6/6.10/12 of mass composition 60%/10%/30%, with an MFI at 235° C. under 5 kg of 6, a melting point of 149° C. and a heat of fusion of 42 J/g.

1.2 Formation of the Pipes

These compositions are then used as binder layer for a multilayer pipe with an outside diameter of 8 mm and an inside diameter of 6 mm. These pipes 1 mm thick are constituted in the following manner:

Outer layer of PA12-TL of 450 μm/binder layer of 50 μm/inner layer of PA6a.

The definitions of PA12-TL and PA6a are as follows:

PA6a denotes a composition based on polyamide 6 with an Mn (number-average molecular mass) of 28 000, containing 10% of plasticizer BBSA (benzyl butyl sulfonamide), 12% of functionalized EPR Exxelor VA1803 (from the company Exxon) and 1.2% of organic stabilizers consisting of 0.8% of phenol (Lowinox 44B25 from the company Great Lakes), 0.2% of phosphite (Irgafos 168 from the company Ciba) and 0.2% of anti-UV agent (Tinuvin 312 from the company Ciba). The melting point of this composition is 215° C.

PA12-TL denotes a composition based on polyamide 12 with an Mn (number-average molecular mass) of 35 000, containing 6% of plasticizer BBSA (benzyl butyl sulfonamide), 6% of anhydride-functionalized EPR Exxelor VA1801 (from the company Exxon), and 1.2% of organic stabilizers consisting of 0.8% of phenol (Lowinox 44B25 from the company Great Lakes), 0.2% of phosphite (Irgafos 168 from the company Ciba) and 0.2% of anti-UV agent (Tinuvin 312 from the company Ciba). The melting point of this composition is 175° C.

1.3 Evaluation of the Pipes

The adhesion was measured on these multilayers before and after immersion in hot biofuel.

ADH1 corresponds to the measurement of the adhesion force expressed in N/cm.

This is reflected by the measurement of the peel force, expressed in N/cm, and measured on the tube before it has been subjected to 15 days of conditioning at 50% relative humidity at 23° C. The given value concerns the weakest interface, i.e. the interface that is the least adherent of the multilayer, where there is the greatest risk of detachment. The peeling is performed at the interface by subjecting one of the parts to traction at an angle of 90° and at a speed of 50 mm/min.

VG=very good, >80
G=good, between 80 and >60
QG=quite good (acceptable), between 60 and >30
P=poor, between 30 and 10
VP<10=very poor ADH2 corresponds to the measurement of the adhesion force after the test in biofuel, expressed in N/cm Same test as for the measurement of ADH1 described above, except that the interior of the pipe is filled with a biofuel E50 at 80° C. for 200 hours. The biofuel E50 is a mixture comprising by mass 50% of ethanol, 44% of gasoline L, 5% of water and 1% of methanol according to standard B31 5220 from the company Peugeot SA, the gasoline known as "L" being the reference lead-free gasoline of the Euro standard, referenced under the code E-H-003. These test conditions are much more severe than the preceding ones. The assessment criteria take this into account and are:

G=good, >30
QG=quite good (acceptable), >20 to <=30
P=poor, >10 to <=20
VP=very poor, <=10

The results are given in Tables 1 and 2 below.

Table 1 comprises compositions 1 to 6 according to the invention.

TABLE 1

|  | 11 | 12 | 13 | 14 | 15 | 16 |
|---|---|---|---|---|---|---|
| PA 6/6.12/12 (6%/88%/6%) | 100 | 89 | — | — | — | — |

TABLE 1-continued

|  | 11 | 12 | 13 | 14 | 15 | 16 |
|---|---|---|---|---|---|---|
| PA 6/6.10/12 (6%/88%/6%) | — | — | 89 | — | — | — |
| PA 6/6.10/12 (85%/5%/10%) | — | — | — | 89 | — | — |
| PA 6/6.12/12/10.10 (6%/88%/3%/3%) | — | — | — | — | — | 89 |
| PA 6.T/6.12/12 (6%/88%/6%) | — | — | — | — | 89 | — |
| EPR1 | — | 10 | — | — | 10 | 10 |
| Plasticizer BBSA | — | — | 10 | 10 | — | — |
| Stab1 | — | 1 | 1 | 1 | 1 | 1 |

Evaluation of the adhesion between the outer layer (made of PA12-TL) and inner layer (made of PA6a) of the multilayer pipe

| ADH1 | 58 | 65 | 61 | 33 | 61 | 66 |
| ADH2 | >30 | >30 | >30 | >30 | >30 | >30 |

Table 2 comprises comparative compositions C1 to C3.

TABLE 2

|  | C1 | C2 | C3 |
|---|---|---|---|
| PA 6/6.10/12 (20%/20%/60%) | 89 | — | — |
| PA 6/6.10/12 (18%/58%/24%) | — | 89 | — |
| PA 6/6.10/12 (60%/10%/30%) | — | — | 89 |
| EPR1 | 10 | — | — |
| Plasticizer BBSA | — | 10 | 10 |
| Stab1 | 1 | 1 | 1 |

Evaluation of the adhesion between the outer layer (made of PA12-TL) and inner layer (made of PA6a) of the multilayer pipe

| ADH1 | 47 | 44 | 45 |
| ADH2 | <10 | <10 | <10 |

Compositions 1, 2, 3, 4, 5 and 6 give satisfactory results in terms of adhesion between the layer of PA12 and the layer of PA6, when compared with the results obtained with the comparative compositions.

Specifically, it was observed that the adhesion (denoted ADH2) obtained with comparative compositions C1, C2 and C3 becomes insufficient after contact with biofuel gasoline.

2/When the Composition According to the Invention Comprises a Mixture of Two Copolyamides Consisting of Units A, B and C 2.1 Preparation of the Compositions The compositions according to the invention given in Table 3 were prepared from the following components. The amounts of products are expressed as weight percentages relative to the total weight of the composition.

PA 6/6.12 (90%/10%) denotes a copolyamide 6/6.12 of mass composition 90%/10%, with an MFI at 235° C. under 5 kg of 7, a melting point of 199° C. and a heat of fusion of 58 J/g.

PA 6.12/12 (10%/90%) denotes a copolyamide 6.12/12 of mass composition 10%190%, with an MFI at 235° C. under 5 kg of 7, a melting point of 163° C. and a heat of fusion of 38 J/g.

PA 6/6.12 (10%/90%) denotes a copolyamide 6/6.12 of mass composition 10%/90%, with an MFI at 235° C. under 5 kg of 5, a melting point of 187° C. and a heat of fusion of 58 J/g.

PA 6.12/12 (90%/10%) denotes a copolyamide 6.12/12 of mass composition 90%/10%, with an MFI at 235° C. under 5 kg of 6, a melting point of 185° C. and a heat of fusion of 52 J/g.

PA 10.T/10.10 (80/20%) denotes a copolyamide 10.T/10.10 of mass composition 80/20%, with an inherent viscosity of 1.10, a melting point Tm of 292° C. and a heat of fusion of 49 J/g.

The comparative composition given in Table 3 was prepared from the following components.

PA 6/6.12 (50%/50%) denotes a copolyamide 6/6.12 of mass composition 50%/50%, with an MFI at 235° C. under 5 kg of 5, a melting point of 148° C. and a heat of fusion of 24 J/g.

PA 6.12/12 (50%/50%) denotes a copolyamide 6.12/12 of mass composition 50%/50%, with an MFI at 235° C. under 5 kg of 4, a melting point of 143° C. and a heat of fusion of 24 J/g.

2.2 Formulations of the Pipes

These compositions are then used as binder layer for a multilayer pipe with an outside diameter of 8 mm and an inside diameter of 6 mm in a manner strictly similar to that of point 1.2.

2.3 Evaluation of the Pipes

The adhesion was measured on these multilayers before and after immersion in hot biofuel, in a manner strictly similar to that of point 1.3.

The compositions and results are given in Table 3 below.

TABLE 3

|  | 21 | 22 | 23 | 24 | 25 | C21 |
|---|---|---|---|---|---|---|
| PA 6/6.12 (90%/10%) | 44.5 | 50 | — | 50 | — | — |
| PA 6.12/12 (10%/90%) | 44.5 | 50 | — | — | — | — |
| PA 6/6.12 (10%/90%) | — | — | 50 | — | 60 | — |
| PA 6.12/12 (90%/10%) | — | — | 50 | 50 | — | — |
| PA 6/6.12 (50%/50%) | — | — | — | — | — | 50 |
| PA 10.T/10.10 (80%/20%) | — | — | — | — | 40 | — |
| PA 6.12/12 (50%/50%) | — | — | — | — | — | 50 |
| EPR1 | 10 | — | — | — | — | — |
| Stab1 | 1 | — | — | — | — | — |
| Evaluation of the adhesion between the outer layer (made of PA 12-TL) and inner layer (made of PA6a) of the multilayer pipe | | | | | | |
| ADH1 | 71 | 80 | 68 | 38 | 37 | 73 |
| ADH2 | >30 | >30 | >30 | >30 | >30 | <10 |

Compositions 21, 22, 23, 24 and 25 give satisfactory results in terms of adhesion between the layer of PA12 and the layer of PA6, when compared with the results obtained with comparative composition C21.

Specifically, it was observed that the adhesion (denoted ADH2) obtained with comparative composition C21 becomes insufficient after contact with the hot biofuel gasoline.

3/When the Composition According to the Invention Comprises a Mixture of a Copolyamide and of a Homopolyamide Consisting of Units A, B and C 3.1 Preparation of the Compositions The compositions according to the invention given in Table 4 were prepared from the following components. The amounts of products are expressed as weight percentages relative to the total weight of the composition.

PA12 denotes polyamide 12 with an inherent viscosity of 1.65. Its melting point is 178° C. and its heat of fusion is 54 kJ/kg.

PA6 denotes a polyamide 6 of Mn (number-average molecular mass) 28 000. Its melting point is 220° C. and its heat of fusion is 68 kJ/kg.

The comparative compositions given in Table 5 were prepared from the following components.

PA 6/12 (50%/50%) denotes a copolyamide 6/12 of mass composition 50%/50%, with an MFI at 235° C. under 5 kg of 4, a melting point of 144° C. and a heat of fusion of 22 J/g.

PA6.12 denotes polyamide 6.12 of Mn (number-average molecular mass) 29 000. Its melting point is 218° C. and its heat of fusion is 67 kJ/kg.

3.2 Formulations of the Pipes

These compositions are then used as binder layer for a multilayer pipe with an outside diameter of 8 mm and an inside diameter of 6 mm, in a manner strictly similar to that of point 1.2.

3.3 Evaluation of the Pipes

The adhesion was measured on these multilayers before and after immersion in hot biofuel, in a manner strictly similar to that of point 1.3.

The compositions according to the invention and results are given in Table 4 below.

TABLE 4

|  | 31 | 32 | 33 | 34 |
|---|---|---|---|---|
| PA 6/6.12 (90%/10%) | 50 | 60 | — | — |
| PA 12 | 39 | 40 | — | 40 |
| PA 6 | — | — | 50 | — |
| PA 6.12/12 (10%/90%) | — | — | 50 | — |
| PA 6/6.12 (10%/90%) | — | — | — | 60 |
| EPR1 | 10 | — | — | — |
| Stab1 | 1 | — | — | — |
| Evaluation of the adhesion between the outer layer (made of PA12-TL) and inner layer (made of PA6a) of the multilayer pipe | | | | |
| ADH1 | 49 | 46 | 46 | 40 |
| ADH2 | >30 | >30 | >30 | >30 |

The comparative compositions and results are given in Table 5 below.

TABLE 5

|  | Without binder | C31 | C32 |
|---|---|---|---|
| PA 12 | — | 40 | — |
| PA 6/12 (50%/50%) | — | 60 | 40 |
| PA6.12 | — | — | 60 |
| EPR1 | — | — | — |
| Stab1 | — | — | — |

TABLE 5-continued

|        | Without binder | C31 | C32 |
|--------|----------------|-----|-----|
| Evaluation of the adhesion between the outer layer (made of PA12-TL) and inner layer (made of PA6a) of the multilayer pipe ||||
| ADH1   | <5             | 45  | 63  |
| ADH2   | <5             | <10 | <10 |

Compositions 31, 32, 33 and 34 give satisfactory results in terms of adhesion between the layer of PA12 and the layer of PA6, when compared with the results obtained with the comparative compositions.

Specifically, it was observed that the adhesion (denoted ADH2) becomes insufficient after contact with hot biofuel gasoline.

4/Various Comparative Examples 4.1 Preparation of the Comparative Compositions

The comparative compositions given in Table 6 were prepared from the following components. The amounts of products are expressed as weight percentages relative to the total weight of the composition.

PA6.10 denotes a polyamide 6.10 of Mn (number-average molecular mass) 30 000 and having an excess of $NH_2$ amine chain ends relative to the COOH chain ends, the concentration of $NH_2$ chain ends being 45 µeq/g. Its melting point is 223° C. and its heat of fusion is 61 kJ/kg.

Binder coPA denotes a composition based on 50% copolyamide 6/12 (of 30/70 mass ratio) of Mn 16 000, and 50% copolyamide 6/12 (of 70/30 mass ratio) of Mn 16 000.

Binder PPg denotes a composition based on PP (polypropylene) grafted with maleic anhydride, known under the name Admer QF551A from the company Mitsui.

Binder PA6.10+PA6 denotes a composition based on PA6.10 obtained by polycondensation of hexanediamine with decanedioic acid (of Mn 30 000, and as defined elsewhere) and 36% of PA6 (of Mn 28 000, and as defined elsewhere); the mass-weighted mean of the heats of fusion is 63.5 J/g and the heat of fusion of the PA6 is 220° C.; and 1.2% of organic stabilizers (consisting of 0.8% of phenol Lowinox 44B25 from the company Great Lakes, 0.2% of phosphite Irgafos 168 from the company Ciba and 0.2% of anti-UV agent 15, Tinuvin 312 from the company Ciba).

Binder PA6.12+PA6 denotes a composition based on PA6.12 obtained by polycondensation of hexanediamine with dodecanedioic acid (of Mn 29 000, and as defined elsewhere) and 36% of PA6 (of Mn 28 000, and as defined elsewhere) and 1.2% of organic stabilizers (consisting of 0.8% of phenol Lowinox 44B25 from the company Great Lakes, 0.2% of phosphite Irgafos 168 from the company Ciba and 0.2% of anti-UV agent Tinuvin 312 from the company Ciba).

Binder PA6.10+PA12 denotes a composition based on PA6.10 obtained by polycondensation of hexanediamine with decanedioic acid (of Mn 30 000, and as defined elsewhere) and 36% of PA12 (of Mn 35 000, and as defined elsewhere) and 1.2% of organic stabilizers (consisting of 0.8% of phenol Lowinox 44B25 from the company Great Lakes, 0.2% of phosphite Irgafos 168 from the company Ciba and 0.2% of anti-UV agent Tinuvin 312 from the company Ciba).

Binder PA6+PA12+imod denotes a composition based on 40% PA6 (of Mn 28 000), 40% of PA12 (of Mn) and 20% of functionalized EPR Exxelor VA1801 (from the company Exxon) and 1.2% of organic stabilizers (consisting of 0.8% of phenol Lowinox 44B25 from the company Great Lakes, 0.2% of phosphite Irgafos 168 from the company Ciba and 0.2% of anti-UV agent Tinuvin 312 from the company Ciba).

PA6.12 denotes polyamide 6.12 obtained by polycondensation of hexanediamine with dodecanedioic acid of Mn (number-average molecular mass) 29 000. Its melting point is 218° C. and its heat of fusion is 67 kJ/kg.

4.2 Formulations of the Pipes

These compositions are then used as binder layer for a multilayer pipe with an outside diameter of 8 mm and an inside diameter of 6 mm, in a manner strictly similar to that of point 1.2.

4.3 Evaluation of the Pipes

The adhesion was measured on these multilayers before and after immersion in hot biofuel, in a manner strictly similar to that of point 1.3.

The comparative compositions and results are given in Table 6 below.

TABLE 6

|  | C41 | C42 | C43 | C44 | C45 | C46 | C47 |
|---|---|---|---|---|---|---|---|
| Binder coPA | 100 | — | — | — | — | — | — |
| Binder PPg | — | 100 | — | — | — | — | — |
| Binder PA6.10 + PA6 | — | — | 100 | — | — | — | — |
| Binder PA6.12 + PA6 | — | — | — | 100 | — | — | — |
| Binder PA6.10 + PA12 | — | — | — | — | 100 | — | — |
| Binder PA6 + PA12 + imod | — | — | — | — | — | 100 | — |
| PA6.12 | — | — | — | — | — | — | 100 |
| Evaluation of the adhesion between the outer layer (made of PA12-TL) and inner layer (made of PA6a) of the multilayer pipe ||||||||
| ADH1 | >60 | >60 | 26 | 28 | 29 | 22 | 18 |
| ADH2 | <10 | <10 | 14 | 16 | 18 | 20 | 11 |

5/Use of the Compositions as Binder for Other Types of Multilayer Structure Based on Polyphthalamide 5.1 Preparation of the Compositions The compositions used are those described above.

5.2 Formulations of the Pipes

These compositions are then used as binder layer for a multilayer pipe with an outside diameter of 8 mm and an inside diameter of 6 mm.

The multilayer structure of these examples is of the following nature: outer layer of PA12-TL of 450 µm/binder layer of 50 µm/inner layer of PPAb.

The purpose of the binder here is to afford adhesion between the PA12 layer and the layer of polyphthalamide of 6.T/6 type, since the latter do not naturally adhere to each other.

PPAb denotes a composition based on polyphthalamide of copolyamide 6.T/6 type Ultramid TKR4351 from the company BASF, and 25% of functionalized EPR Exxelor VA1803 (from the company Exxon), and 0.5% of stabilizer based on copper and potassium iodide of Iodide P201 type (from the company Ciba). The melting point of this composition is 295° C.

5.3 Evaluation of the Pipes

The adhesion was measured on these multilayers before and after immersion in hot biofuel, in a manner strictly similar to that of point 1.3.

The compositions according to the invention and comparative compositions and the results are given in Table 7 below.

TABLE 7

|  | 11 | 12 | 21 | 31 | C11 |
|---|---|---|---|---|---|
| PA 6/6.12/12 (6%/88%/6%) | 100 | 89 | — | — | — |
| PA 6/6.12 (90%/10%) | — | — | 44.5 | 50 | — |
| PA 6.12/12 (10%/90%) | — | — | 44.5 | — | — |
| PA 12 | — | — | — | 39 | — |
| PA 6/6.10/12 (20%/20%/60%) | — | — | — | — | 89 |
| EPR1 | — | 10 | 10 | 10 | 10 |
| Stab1 | — | 1 | 1 | 1 | 1 |
| Evaluation of the adhesion between the outer layer (made of PA12-TL) and inner layer (made of polyphthalamide PPAb) of the multilayer pipe | | | | | |
| ADH1 | 55 | 68 | 65 | 51 | 49 |
| ADH2 | >30 | >30 | >30 | >30 | <10 |

It is found that good adhesion values are also obtained between the layer of PA12 and the layer of polyphthalamide of PA6.T/6 type, especially after exposure to biofuel, in contrast with the comparative examples.

6/Use of the Compositions as Binder for Other Types of Multilayer Structure Based on EVOH 6.1 Preparation of the Compositions
The compositions used are those described above.
6.2 Formulations of the Pipes
These compositions are then used as binder layer for a multilayer pipe with an outside diameter of 8 mm and an inside diameter of 6 mm. The pipes are made by coextrusion of the compositions in the melt, i.e. above their melting point.

The multilayer structure of these examples is now of the following nature: outer layer of PA12-TL of 425 μm/binder layer of 50 μm/layer of EVOH of 100 μm/inner layer of PA6a of 425 μm.

The purpose of the binder here is to afford adhesion between the PA12 layer and the EVOH layer, since the latter do not naturally adhere to each other.

EVOH denotes a copolymer of ethylene vinyl alcohol, for example Soarnol DC3203RB from the company Nippon Gosei. The melting point of this composition is 183° C.
6.3 Evaluation of the Pipes
The adhesion was measured on these multilayers before and after immersion in hot biofuel, in a manner strictly similar to that of point 1.3.

The compositions according to the invention and comparative compositions and the results are given in Table 8 below.

|  | 11 | 12 | 21 | 31 | C13 | C21 | C31 |
|---|---|---|---|---|---|---|---|
| PA 6/6.12/12 (6%/88%/6%) | 100 | 89 | — | — | — | — | — |
| PA 6/6.12 (90%/10%) | — | — | 44.5 | 50 | — | — | — |
| PA 6.12/12 (10%/90%) | — | — | 44.5 | — | — | — | — |
| PA 12 | — | — | — | 39 | — | — | 40 |
| PA 6/6.10/12 (60%/10%/30%) | — | — | — | — | 89 | — | — |
| PA 6/6.12 (50%/50%) | — | — | — | — | — | 50 | — |
| PA 6.12/12 (50%/50%) | — | — | — | — | — | 50 | — |
| PA 6/12 | — | — | — | — | — | — | 60 |
| EPR1 | — | 10 | 10 | 10 | — | — | — |
| BBSA | — | — | — | — | 10 | — | — |
| Stab1 | — | 1 | 1 | 1 | 1 | — | — |
| Evaluation of the adhesion between the outer layer (made of PA12-TL) and the EVOH layer of the multilayer pipe | | | | | | | |
| ADH1 | 44 | 49 | 59 | 50 | 70 | 64 | 42 |
| ADH2 | >30 | >30 | >30 | >30 | <10 | <10 | <10 |

It is observed that good adhesion values are also obtained between the layer of PA12 and the layer of EVOH, especially after exposure to biofuel, in contrast with the comparative examples.

7/Example of a Process for Manufacturing Multilayer Structures

In the Case of Pipes

Multilayer pipes are made by coextrusion. A McNeil multilayer extrusion industrial line is used, equipped with 5 extruders connected to a multilayer extrusion head with spiral mandrels.

The screws used are single extrusion screws having screw profiles adapted to the polyamides. In addition to the 5 extruders and the multilayer extrusion head, the extrusion line comprises:
  a die-punch assembly, located at the end of the coextrusion head; the inside diameter of the die and the outside diameter of the punch are chosen as a function of the structure to be made and of the materials of which it is composed, and also as a function of dimensions of the pipe and of the line speed;
  a vacuum tank with an adjustable level of vacuum. In this tank circulates water maintained in general at 20° C., into which is immersed a gauge for conforming the pipe to its final dimensions. The diameter of the gauge is adapted to the dimensions of the pipe to be made, typically from 8.5 to 10 mm for a pipe with an outside diameter of 8 mm and a thickness of 1 mm;
  a succession of cooling tanks in which water is maintained at about 20° C., for cooling the pipe along the path from the drawing head to the drawing bench;
  a diameter measurer;
  a drawing bench.

The configuration with 5 extruders is used to make pipes ranging from 2 layers to 5 layers. In the case of the structures in which the number of layers is less than 5, several extruders are then fed with the same material.

The invention claimed is:
1. A polyamide consisting of the following units:
  at least one unit denoted A with a mean number of carbon atoms per nitrogen atom, denoted $C_A$, ranging from 4 to 8.5;
  at least one unit denoted B with a mean number of carbon atoms per nitrogen atom, denoted $C_B$, ranging from 7 to 10;
  at least one unit denoted C with a mean number of carbon atoms per nitrogen atom, denoted $C_C$, ranging from 9 to 18; and optionally at least one unit Z other than an amide unit;

one of the units A, B or C being in very predominant proportion in the polyamide and representing from 80% to 97% by weight relative to the total weight of the polyamide, the mean number of carbon atoms per nitrogen atom of the units A, B and C also corresponding to the following strict inequality: $C_A<C_B<C_C$, the heat of fusion of the polyamide being greater than 25 J/g (DSC), the melting point of the polyamide being greater than 150° C. (DSC), and wherein unit B is the very predominant unit in the polyamide.

2. The polyamide as claimed in claim 1, wherein the polyamide consists of only one unit A, only one unit B and only one unit C.

\* \* \* \* \*